(12) United States Patent
Chiang et al.

(10) Patent No.: US 8,446,946 B2
(45) Date of Patent: May 21, 2013

(54) VIDEO PROCESSING METHOD AND SYSTEM

(75) Inventors: Chi-Cheng Chiang, Taipei Hsien (TW); Chih-Hsiang Lin, Taipei Hsien (TW)

(73) Assignee: Acer Incorporated, Taipei, Hsien (TW)

( * ) Notice: Subject to any disclaimer, the term of this patent is extended or adjusted under 35 U.S.C. 154(b) by 351 days.

(21) Appl. No.: 12/583,142

(22) Filed: Aug. 14, 2009

(65) Prior Publication Data

US 2010/0040137 A1    Feb. 18, 2010

(30) Foreign Application Priority Data

Aug. 15, 2008 (TW) ............................... 97131135 A (51) Int. Cl.
*H04N 7/24* (2006.01)
(52) U.S. Cl.
USPC ................. 375/240.02; 375/240.01; 382/276; 382/232
(58) Field of Classification Search ....................... None
See application file for complete search history.

(56) References Cited

U.S. PATENT DOCUMENTS

| | | | | |
|---|---|---|---|---|
| 2004/0017850 A1* | 1/2004 | Kim et al. | ................. | 375/240.01 |
| 2004/0240752 A1* | 12/2004 | Dobbs et al. | ................. | 382/276 |
| 2005/0169537 A1* | 8/2005 | Keramane | ..................... | 382/232 |

FOREIGN PATENT DOCUMENTS

| | | |
|---|---|---|
| CN | 1839618 A | 9/2006 |
| CN | 1914925 A | 2/2007 |

OTHER PUBLICATIONS

Chinese Office Action for counterpart application No. CN 200810161273.9, 7 pgs., mailed Sep. 14, 2010.

* cited by examiner

*Primary Examiner* — Christopher S Kelley
*Assistant Examiner* — Mohammed Jebari
(74) *Attorney, Agent, or Firm* — Blakely, Sokoloff, Taylor & Zafman LLP (57) ABSTRACT

A video processing method is implemented by transmitting and receiving devices, and includes: obtaining a standard resolution source image frame from an image sequence, and detecting a network bandwidth; when an encoding bit rate of the source image frame exceeds the network bandwidth, decreasing a resolution thereof to obtain reduced image frame content and generating a relay image frame containing the same and having an encoding bit rate not exceeding the network bandwidth; generating an encoded image frame by encoding the source or the relay image frame, and sending the encoded image frame to the receiving device; and decoding the encoded image frame to obtain the source or the relay image frame, and recovering from the relay image frame, when obtained, a restored image frame corresponding to the reduced image frame content and having the standard resolution. A video processing system is also disclosed.

8 Claims, 6 Drawing Sheets

FIG. 7

VIDEO PROCESSING METHOD AND SYSTEM

CROSS-REFERENCE TO RELATED APPLICATION

This application claims priority of Taiwanese Application No. 097131135, filed on Aug. 15, 2008.

BACKGROUND OF THE INVENTION

1. Field of the Invention

The present invention relates to a video processing method and system. More particularly, the present invention relates to a video processing method and system, in which encoding bit rates of source image frames from an image sequence are checked against a bandwidth of a network which may vary, and changed as needed when it is determined that any of the encoding bit rates exceed said bandwidth.

2. Description of the Related Art

Figure 1:
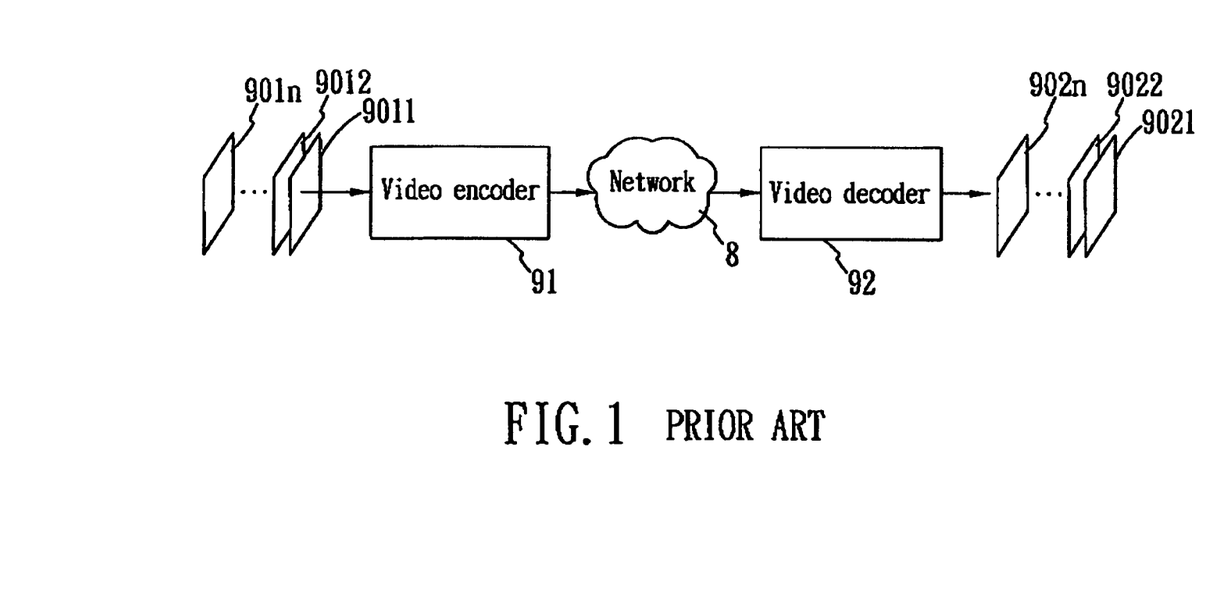
FIG. 1 is a schematic block diagram of a conventional video processing system.

FIG. 1 shows the basic layout of a conventional video processing system. As an example, the conventional video processing system may be a videoconference system. In the conventional video processing system, a plurality of source image frames $9011 \sim 901n$ included in a real-time image sequence are compressed into video signals by a video encoder 91. The video signals are then transmitted via a network 8 to a video decoder 92. The video decoder 92 decodes the video signals for recovery into a series of output image frames $9021 \sim 902n$.

In the conventional video processing system, the entire process from inputting the source image frames $9011 \sim 901n$ into the video encoder 91 to transmitting the resulting signals via the network 8 for output to the video decoder 92 is conducted using a single fixed resolution. Therefore, if the bandwidth of the network 8 is abruptly reduced by a significant amount, and the encoding bit rate (data amount of each frame×frame rate) exceeds the bandwidth, this will result in intermittent and/or unclear pictures at the receiving end.

One approach used in the conventional video processing system to overcome the above problem is that in which the resolution of the source image frames $9011 \sim 901n$ is initially set sufficiently low so that any unexpected drop in the bandwidth of the network 8 will not result in an encoding bit rate that exceeds the bandwidth. However, such an approach is not ideal since the resulting output image frames $9021 \sim 902n$ will be of a low quality.

According to another conventional approach, bandwidth detection is performed prior to operation of the video processing system, after which the resolution to be employed by the video encoder 91 is determined based on the detected bandwidth. However, no further adjustment in resolution is possible with the use of such an approach. This may be quite problematic in situations where the bandwidth detected prior to operation of the video processing system is not representative of the typical bandwidth of the network 8.

According to yet another conventional approach, operation of the video processing system is discontinued and the resolution is reset, after which the system is restarted. In the case where the video processing system is a videoconference system, such a pause in operation is not the best way to remedy problems encountered in a system operating in real-time.

SUMMARY OF THE INVENTION

Therefore, the object of the present invention is to provide a video processing method and system, in which encoding bit rates of source image frames from an image sequence are checked against a bandwidth of a network which may vary, and changed as needed when it is determined that any of the encoding bit rates exceed said bandwidth.

The video processing method is implemented by a transmitting device and a receiving device, the transmitting device communicating with the receiving device via a network. The video processing method comprises: (a) configuring the transmitting device to obtain a source image frame having a standard resolution from an image sequence, and to detect a bandwidth of the network; (b) when an encoding bit rate of the source image frame obtained in step (a) exceeds the bandwidth of the network, configuring the transmitting device to decrease a resolution of the source image frame to thereby obtain reduced image frame content with a reduced resolution and to generate a relay image frame containing the reduced image frame content and having an encoding bit rate that does not exceed the bandwidth of the network; (c) configuring the transmitting device to generate an encoded image frame by encoding one of the source image frame obtained in step (a) when the encoding bit rate of the source image frame does not exceed the bandwidth of the network, and the relay image frame generated in step (b) when the encoding bit rate of the source image frame obtained in step (a) exceeds the bandwidth of the network, and further configuring the transmitting device to send the encoded image frame to the receiving device via the network; and (d) configuring the receiving device to decode the encoded image frame to obtain one of the source image frame obtained in step (a) and the relay image frame generated in step (b), and when the relay image frame is obtained, further configuring the receiving device to recover from the relay image frame a restored image frame corresponding to the reduced image frame content and having the standard resolution.

A transmitting device for a video processing system is connected to a network and comprises: an image sequence capture module for obtaining a source image frame having a standard resolution from an image sequence; a network bandwidth monitor module for detecting a bandwidth of the network; a pseudo resolution modification module coupled to the image sequence capture module to receive the source image frame therefrom, and further coupled to the network bandwidth monitor module, the pseudo resolution modification module, when an encoding bit rate of the source image frame obtained by the image sequence capture module exceeds the bandwidth of the network, decreasing a resolution of the source image frame to thereby obtain reduced image frame content with a reduced resolution, and generating a relay image frame containing the reduced image frame content and having an encoding bit rate that does not exceed the bandwidth of the network; a video encoder coupled to the pseudo resolution modification module to receive one of the source image frame and the relay image frame therefrom, and further coupled to the network bandwidth monitor module, the video encoder generating an encoded image frame by encoding one of the source image frame obtained by the image sequence capture module when the encoding bit rate of the source image frame does not exceed the bandwidth of the network, and the relay image frame generated by the pseudo resolution modification module when the encoding bit rate of the source image frame obtained by the image sequence capture module exceeds the bandwidth of the network; and a data sender coupled to the video encoder to receive the encoded image frame therefrom, the data sender sending the encoded image frame to the network.

The video processing system comprises a transmitting device and a receiving device.

The transmitting device is connected to a network and includes: an image sequence capture module for obtaining a source image frame having a standard resolution from an image sequence; a network bandwidth monitor module for detecting a bandwidth of the network; a pseudo resolution modification module coupled to the image sequence capture module to receive the source image frame therefrom, and further coupled to the network bandwidth monitor module, the pseudo resolution modification module, when an encoding bit rate of the source image frame obtained by the image sequence capture module exceeds the bandwidth of the network, decreasing a resolution of the source image frame to thereby obtain reduced image frame content with a reduced resolution, and generating a relay image frame containing the reduced image frame content and having an encoding bit rate that does not exceed the bandwidth of the network; a video encoder coupled to the pseudo resolution modification module to receive one of the source image frame and the relay image frame therefrom, and further coupled to the network bandwidth monitor module, the video encoder generating an encoded image frame by encoding one of the source image frame obtained by the image sequence capture module when the encoding bit rate of the source image frame does not exceed the bandwidth of the network, and the relay image frame generated by the pseudo resolution modification module when the encoding bit rate of the source image frame obtained by the image sequence capture module exceeds the bandwidth of the network; and a data sender coupled to the video encoder to receive the encoded image frame therefrom, the data sender sending the encoded image frame to the network.

The receiving device is connected to the network and includes: a data receiving module receiving the encoded image frame from the data sender of the transmitting device via the network; a video decoder coupled to the data receiving module to receive the encoded image frame therefrom, the video decoder decoding the encoded image frame to obtain one of the source image frame obtained by the image sequence capture module and the relay image frame generated by the pseudo resolution modification module; and a resolution recovery module coupled to the video encoder to receive one of the source image frame and the relay image frame, the resolution recovery module recovering from the relay image frame a restored image frame corresponding to the reduced image frame content and having the standard resolution when the relay image frame is obtained by the video decoder.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 2:
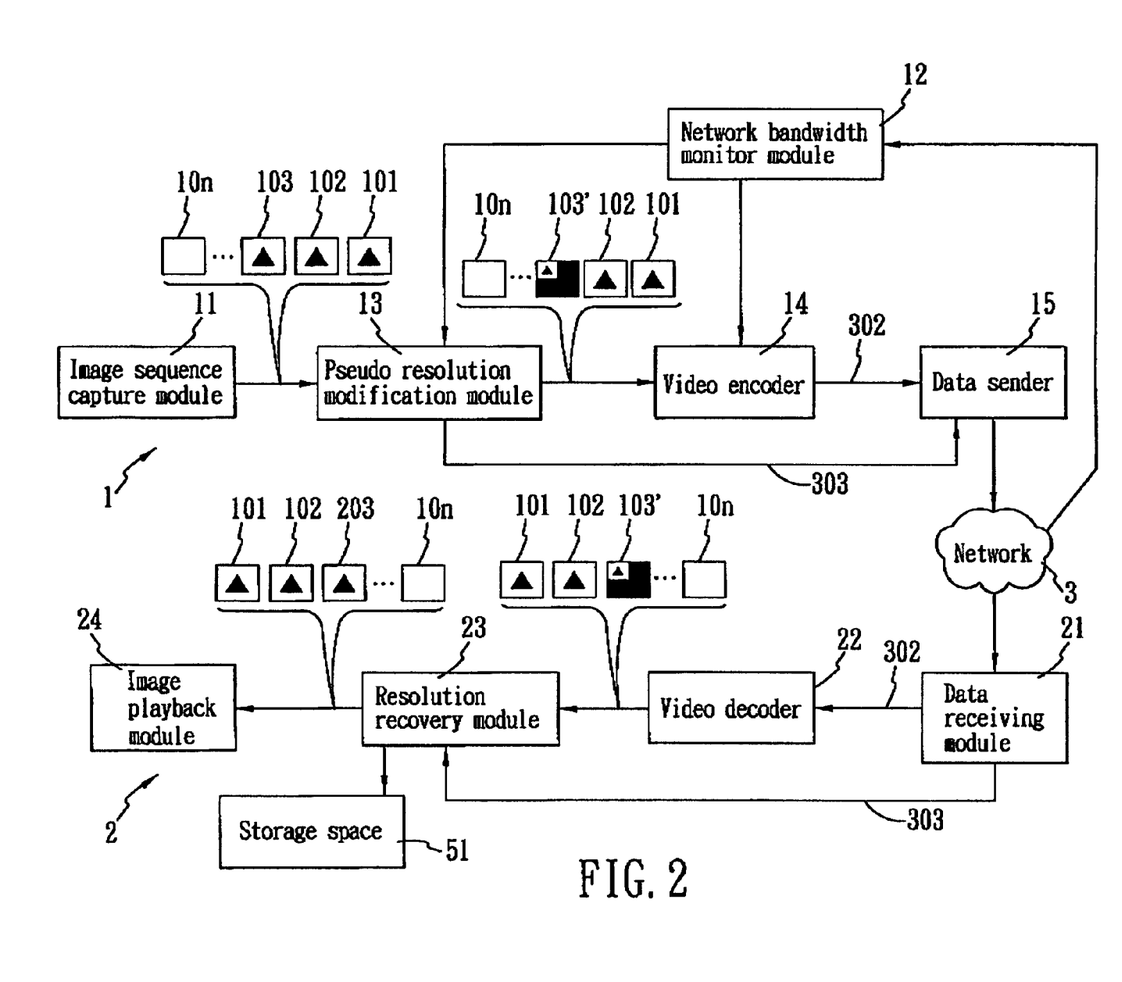
FIG. 2 is a schematic block diagram of a video processing system according to a preferred embodiment of the present invention.

Referring to FIG. 2, a video processing system according to a preferred embodiment of the present invention comprises a transmitting device 1 and a receiving device 2, and the transmitting and receiving devices 1, 2 are connected to and communicate via a network 3.

In the preferred embodiment, the transmitting device 1 comprises an image sequence capture module 11, a network bandwidth monitor module 12, a pseudo resolution modification module 13, a video encoder 14, and a data sender 15. Further, in the preferred embodiment, the receiving device 2 comprises a data receiving module 21, a video decoder 22, a resolution recovery module 23, an image playback module 24, and a storage space 51.

A video processing method according to a preferred embodiment of the present invention is implemented by the transmitting device 1 and the receiving device 2 of the video processing system. The video processing method will now be described with reference to FIGS. 2 and 3.

Figure 3:
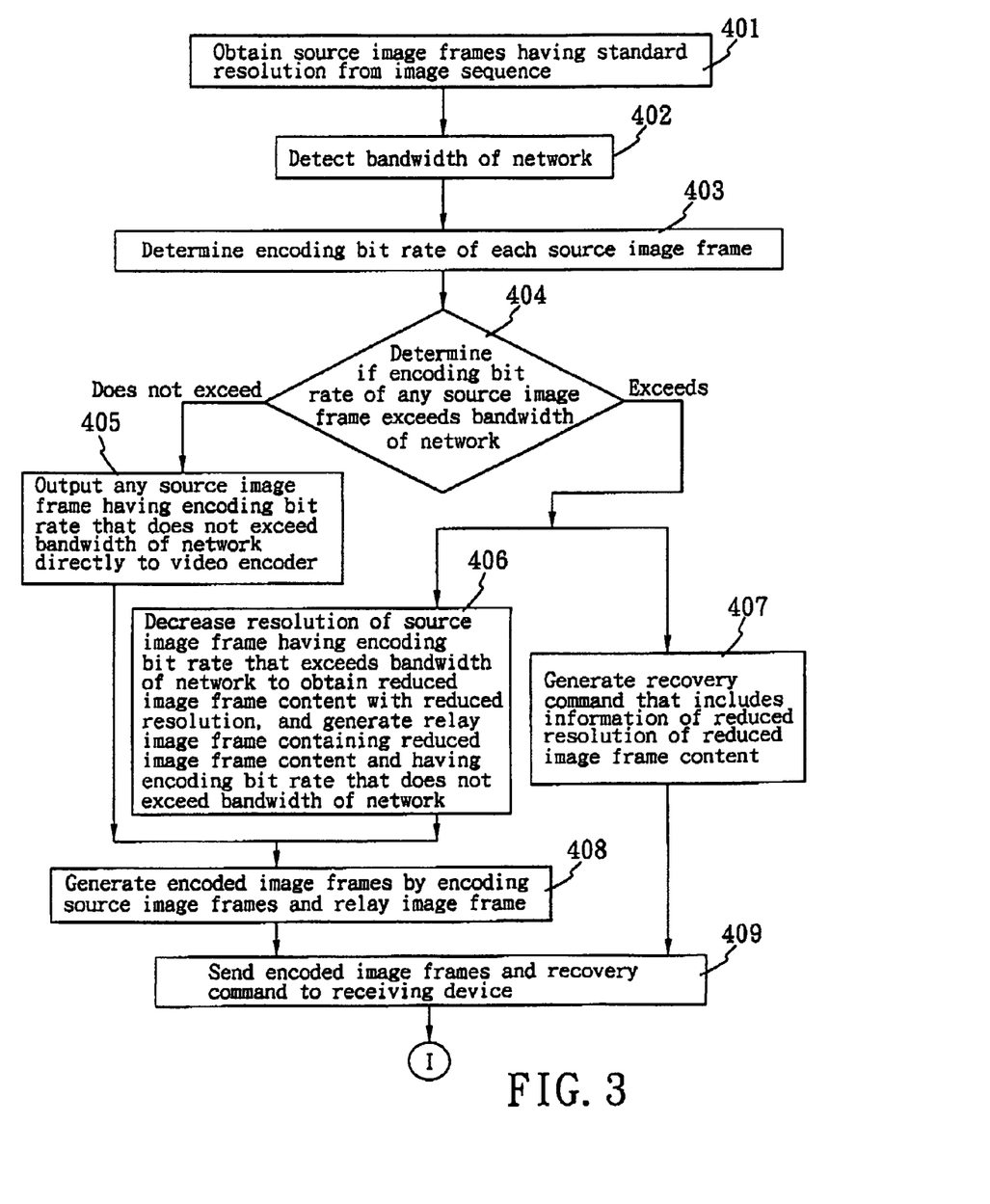
FIG. 3 is a flowchart of steps in a video processing method that are performed by a transmitting device according to a preferred embodiment of the present invention.

First, in step 401, the image sequence capture module 11 of the transmitting device 1 obtains a plurality of source image frames 101-10$n$ having a standard resolution from an image sequence. As an example, the standard resolution may be 640×480.

Next, in step 402, the network bandwidth monitor module 12 detects a bandwidth of the network 3.

In step 403, the pseudo resolution modification module 13, which is coupled to the image sequence capture module 11 to receive the source image frames 101-10$n$ therefrom, determines an encoding bit rate of each of the source image frames 101-10$n$ obtained by the image sequence capture module 11.

Furthermore, in step 404, the pseudo resolution modification module 13, which is further coupled to the network bandwidth monitor module 12, determines if the encoding bit rate of any of the source image frames 101-10$n$ exceeds the bandwidth of the network 3 detected by the network bandwidth monitor module 12. For purposes of illustration, it is assumed that the encoding bit rate of the source image frame 103 exceeds the bandwidth of the network 3.

In step 405, the pseudo resolution modification module 13 outputs any of the source image frames 101~10$n$ having an encoding bit rate that does not exceed the bandwidth of the network 3 directly to the video encoder 14.

In step 406, the pseudo resolution modification module 13 decreases the resolution of the source image frame 103 having the encoding bit rate that exceeds the bandwidth of the network 3 to thereby obtain reduced image frame content with a reduced resolution, and generates a relay image frame 103' containing the reduced image frame content and having an encoding bit rate that does not exceed the bandwidth of the network 3. As an example, the resolution of the source image frame 103 is reduced from 640×480 to 320×240 to obtain the reduced image frame content. Downsampling techniques may be used by the pseudo resolution modification module 13 to decrease the resolution of the source image frame 103 to obtain the reduced image frame content. Further, downsampling may be performed such that the size of the reduced image frame content is reduced from the size of the source image frame 103 by equal proportions.

Figure 4A:
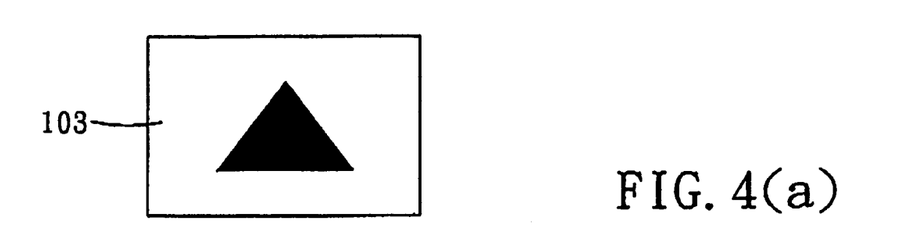
FIGS. 4(a) and 4(b) are schematic diagrams, illustrating a source image frame having a standard resolution, and reduced image frame content with a reduced resolution.
Figure 4B:
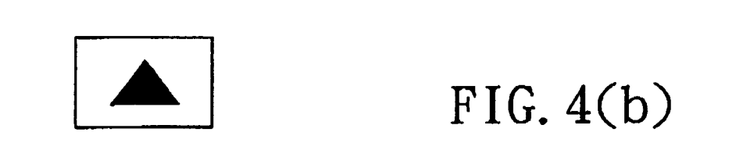

As a result of decreasing the resolution of the source image frame 103 having the encoding bit rate that exceeds the bandwidth of the network 3, the reduced image frame content is decreased in size from a size of the source image frame 103 shown in FIG. 4(a) to a size of the reduced image frame content as shown in FIG. 4(b).

Figure 5:
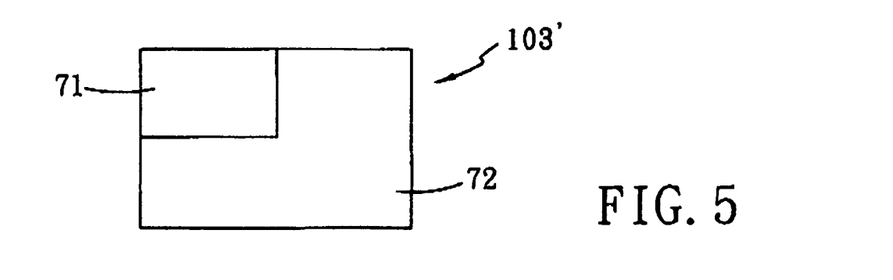
FIG. 5 is a schematic diagram, illustrating first and second regions of a relay image frame generated by a pseudo resolution modification module of the video processing system of the preferred embodiment.
Figure 6A:
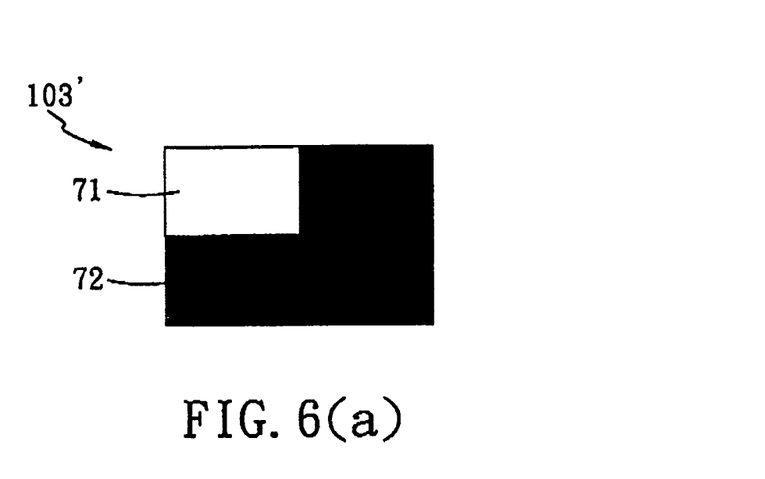
FIGS. 6(a) and 6(b) are schematic diagrams, illustrating two examples of how the second region of the relay image generated by the pseudo resolution modification module may be filled with predetermined data.
Figure 6B:
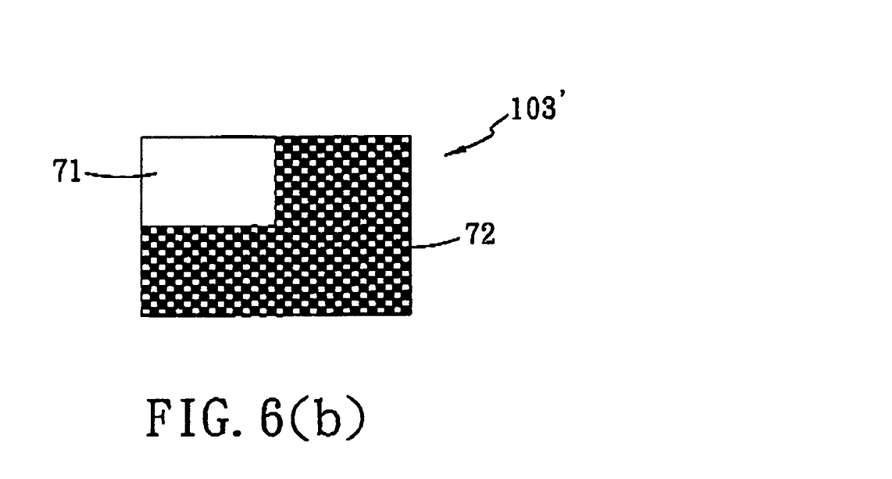

In some embodiments, with reference to FIG. 5, the relay image frame 103' generated by the pseudo resolution modification module 13 includes a first region 71 and a second region 72, a sum of sizes of the first and second regions being equal to a size of the source image frames 101-10n having the standard resolution obtained by the image sequence capture module 11. Furthermore, in some embodiments, the first region 71 is filled with the reduced image frame content, and the second region 72 is filled with predetermined data. For example, in one embodiment, the second region 72 is filled with pixels having vector values of 0, as shown in FIG. 6(a), and in another embodiment, the second region 72 is filled with pixels having vector values alternating between 0 and 255, as shown in FIG. 6(b). In either case, a data size of the resulting relay image frame 103' will be much smaller than before processing of the source image frame 103 was performed, that is, at least small enough such that the encoding bit rate of the relay image frame 103' does not exceed the bandwidth of the network 3.

In step 407, the pseudo resolution modification module 13, which is further coupled to the data sender 15, generates a recovery command 303 that includes information of the reduced resolution of the reduced image frame content, and outputs the recovery command 303 to the data sender 15.

In step 408, the video encoder 14, which is coupled to the network bandwidth monitor module 12, the pseudo resolution modification module 13, and the data sender 15, generates a plurality of encoded image frames 302 by encoding the source image frames 101-10n obtained by the image sequence capture module 11 and by encoding the relay image frame 103' generated by the pseudo resolution modification module 13. The video encoder 14 subsequently outputs the encoded image frames 302 to the data sender 15.

The pixel colors of each of the source image frames 101-10n and the relay image frame 103' received by the video encoder 14 from the pseudo resolution modification module 13 can be represented by three color space vectors, such as R, G, and B or Y, U, and V. The algorithm of the video encoder 14 typically involves using Y, U, and V. If the source image frames 101-10n are not represented by Y, U, and V, the pseudo resolution modification module 13 may convert the source image frames 101-10n to be represented by Y, U, and V before performing any resolution modification.

In step 409, the data sender 15 sends the encoded image frames 302 and the recovery command 303 to the receiving device 2 via the network 3.

Figure 7:
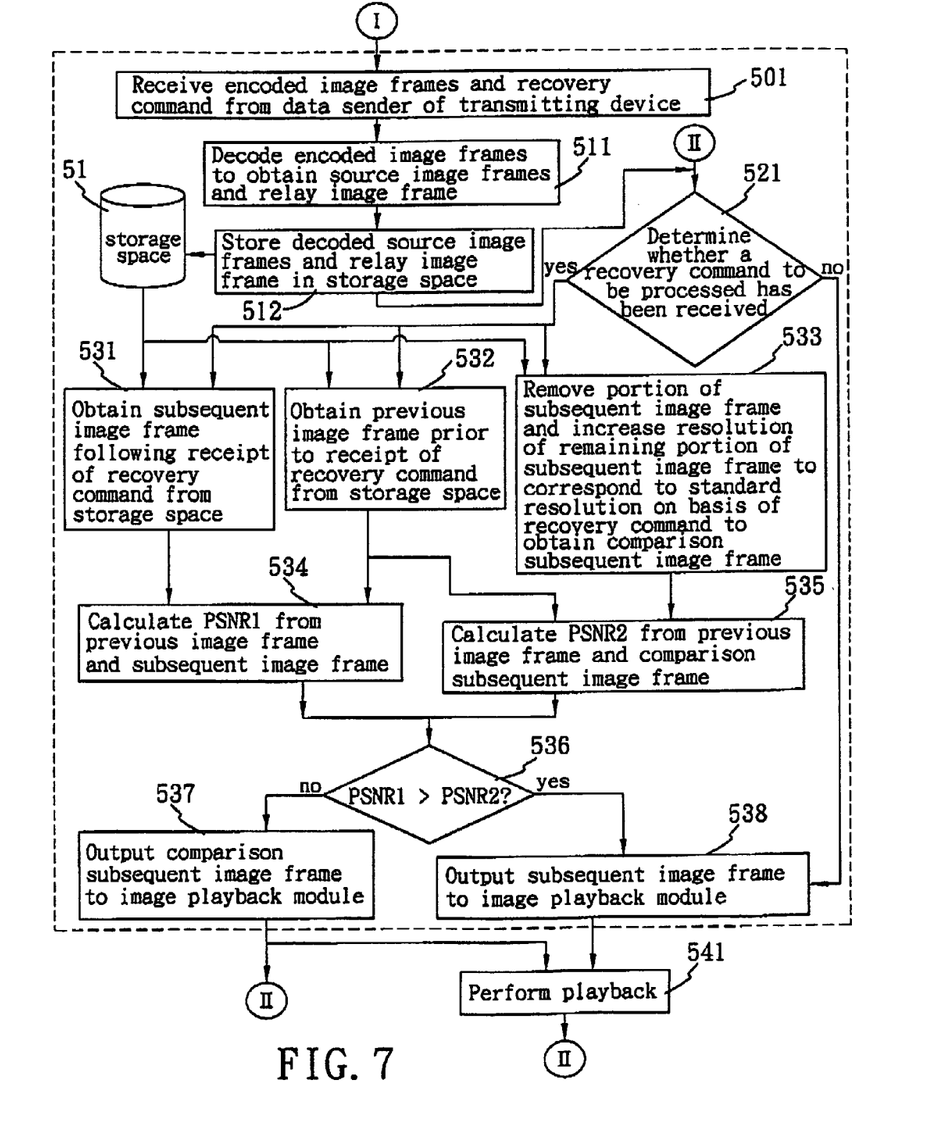
FIG. 7 is a flowchart of steps in the video processing method of the preferred embodiment that are performed by a receiving device.

The processes performed by the receiving device 2 will now be described with reference to FIGS. 2 and 7.

In step 501, the data receiving module 21 of the receiving device 2, which is coupled to the video decoder 22 and the resolution recovery module 23 of the receiving device 2, receives the encoded image frames 302 and the recovery command 303 from the data sender 15 of the transmitting device 1 via the network 3, outputs the encoded image frames 302 to the video decoder 22, and further outputs the recovery command 303 to the resolution recovery module 23.

In step 511, the video decoder 22, which is further coupled to the resolution recovery module 23 of the receiving device 2, decodes the encoded image frames 302 transferred from the data receiving module 21 to obtain the source image frames 101-10n obtained by the image sequence capture module 11 of the transmitting device 1 and the relay image frame 103' generated by the pseudo resolution modification module 13 of the transmitting device 1. The video decoder 22 then outputs the decoded source image frames 101-10n and the decoded relay image frame 103' to the resolution recovery module 23.

It is to be noted that the video encoder 14 of the transmitting device 1 and the video decoder 22 of the receiving device 2 form an encoding/decoding unit, and may be implemented using standard components, such as those complying with MPEG-4 (Moving Picture Experts Group) or H.264 standards. The video processing method of this invention does not alter the internal algorithms employed by the video encoder 14 or the video decoder 22.

In step 512, the resolution recovery module 23, which is coupled to the storage space 51 of the receiving device 1, stores the decoded source image frames 101-10n and the decoded relay image frame 103' in the storage space 51.

In step 521, the resolution recovery module 23 determines whether a recovery command to be processed has been received from the data receiving module 21. As described above, it has been assumed, for purposes of illustration, that the encoding bit rate of the source image frame 103 exceeds the bandwidth of the network 3. Hence, in this example, with further reference back to FIG. 3, the recovery command 303 is generated in step 407, the data sender 15 sends the recovery command 303 to the receiving device 2 via the network 3 in step 409, and the data receiving module 21 of the receiving device 2 outputs the received recovery command 303 to the resolution recovery module 23 in step 501. However, in actual practice, it is not necessarily the case that a recovery command will have been received from the data receiving module 21 (i.e., that an encoding bit rate of a source image frame exceeds the bandwidth of the network 3), and hence, step 521 of determining whether a recovery command to be processed has been received needs to be performed.

If a recovery command to be processed has not been received from the data receiving module 21 in step 521, the flow proceeds to step 538 of the resolution recovery module 23 directly outputting the source image frames 101-10n received from the video decoder 22 to the image playback module 24 of the receiving device 2, after which the image playback module 24 performs playback of the source image frames 101-10n in step 541.

However, the following steps are performed if a recovery command to be processed has been received from the data receiving module 21 in step 521. Under ideal conditions, the resolution recovery module 23 would perform recovery operations with respect to the relay image frame 103' immediately after receipt of the recovery command 303. However, due to such factors as network delay or decoding delay, it cannot be assured that the first image frame received after receipt of the recovery command 303 is the relay image frame 103'. Nevertheless, it can be assured that the image frame to which recovery operations need to be performed always comes subsequent to the reception of the recovery command 303, or stated differently, that the image frame prior to receipt of the recovery command 303 is not the relay image frame 103' and is one of the source image frames 101-10n.

In the preferred embodiment, this information is used together with peak signal-to-noise ratio (PSNR) to determine whether the image frame after receipt of the recovery command 303 is one of the source image frames 101-10n or the relay image frame 103'.

As well known in the art, PSNR may be used to determine the similarity between two images. In particular, the larger the PSNR, the more alike the two images are, and the smaller the PSNR, the greater the difference in the two images.

PSNR may be defined as follows:

$$PSNR = 10 \cdot \log_{10}\left(\frac{MAX^2}{MSE}\right) \quad \text{Formula 1}$$

where MAX is a predetermined value, and MSE is a mean squared error, and is defined as:

$$MSE = \frac{1}{N}\sum_{i=0}^{N-1} \|I(i) - K(i)\|^2 \quad \text{Formula 2}$$

where (I) and (K) are image frames of the same size to be compared, I(i) and K(i) are values respectively of the image frames (I) and (K) at pixel (i), and (N) is a total number of pixels of any one of the image frames (I) and (K).

In step 531, the resolution recovery module 23 of the receiving device 2 obtains a subsequent image frame (Image1) following receipt of the recovery command 303 from the storage space 51.

In step 532, the resolution recovery module 23 of the receiving device 2 obtains a previous image frame (Image0) prior to receipt of the recovery command 303 from the storage space 51.

In step 533, the resolution recovery module 23 of the receiving device 2 removes a portion of the subsequent image frame (Image1) corresponding to where the second region would be located if the subsequent image frame were the relay image frame 103', and increases a resolution of a remaining portion of the subsequent image frame (Image1) to correspond to the standard resolution on the basis of the recovery command 303 to thereby obtain a comparison subsequent image frame (Image1').

Next, in step 534, the resolution recovery module 23 calculates a first peak signal-to-noise ratio (PSNR) (PSNR1) from the previous image frame (Image0) and the subsequent image frame (Image1).

In step 535, the resolution recovery module 23 calculates a second PSNR (PSNR2) from the previous image frame (Image0) and the comparison subsequent image frame (Image1').

Subsequently, in step 536, the resolution recovery module 23 determines whether the first PSNR (PSNR1) is larger than the second PSNR (PSNR2).

If the first PSNR (PSNR1) is larger than the second PSNR (PSNR2), this means that the subsequent image frame (Image1) is more similar to the previous image frame (Image0) than the comparison subsequent image frame (Image1') is to the previous image frame (Image0), and hence, that the subsequent image frame (Image1) is one of the source image frames 101-10n.

However, if the first PSNR (PSNR1) is not larger than the second PSNR (PSNR2), this means that the comparison subsequent image frame (Image1') is more similar to the previous image frame (Image0) than the subsequent image frame (Image1) is to the previous image frame (Image0). That is, if the first PSNR (PSNR1) is not larger than the second PSNR (PSNR2), this indicates that the comparison subsequent image frame (Image1') is the relay image frame 103'.

In step 537, if it has been determined in step 536 that the first PSNR (PSNR1) is not larger than the second PSNR (PSNR2), the resolution recovery module 23 outputs the comparison subsequent image frame (Image1') to the image playback module 24 for playback in step 541, and, at the same time, the process repeats starting from step 521 of determining whether a new recovery command is received from the data receiving module 21.

As mentioned above, if it has been determined in step 536 that the first PSNR (PSNR1) is not larger than the second PSNR (PSNR2), this means that the subsequent image frame (Image1) is not one of the source image frames 101-10n. Stated differently, in this case, in step 533, the resolution recovery module 23 has recovered from the relay image frame 103' a restored image frame 203 (see FIG. 2) corresponding to the reduced image frame content and having the standard resolution, and hence, it is this restored image frame 203 that is being output to the image playback module 24 in step 537 for playback in step 541. Furthermore, since the subsequent image frame (Image1) is not one of the source image frames 101-10n, it follows that the resolution recovery module 23 performs such recovery to obtain the restored image frame 203 on the basis of the recovery command 303 (since the resolution recovery module 23 is described as obtaining the comparison subsequent image frame (Image1') on the basis of the recovery command 303 in step 533).

However, in step 538, if it has been determined in step 536 that the first PSNR (PSNR1) is larger than the second PSNR (PSNR2), then the resolution recovery module 23 outputs the subsequent image frame (Image1) to the image playback module 24 for playback in step 541, after which the process repeats starting from step 521 of determining whether a recovery command to be processed has been received. Since a recovery command to be processed has been received in this case, i.e., the recovery command 303, the process continues with steps 531, 532, and 533 with respect to one of the source image frames 101-10n confirmed to have an encoding bit rate that does not exceed the bandwidth of the network 3 (e.g., the previous image frame (Image0) or the subsequent image frame (Image1)) and a next subsequent image frame (Image2), and the image playback module 24 of the receiving device 2 plays back one of the next subsequent image frame (Image2) if the first PSNR (PSNR1) is larger than the second PSNR (PSNR2), and a next comparison subsequent image frame (Image2') obtained from the next subsequent image frame (Image2) if the first PSNR (PSNR1) is not larger than the second PSNR (PSNR2). Furthermore, the resolution recovery module 23 and the image playback module 24 repeat these operations with respect to one of the source image frames 101-10n confirmed to have an encoding bit rate that does exceeds the bandwidth of the network (e.g., the previous image frame (Image0) or a progressively successive previous image frame) and a progressively successive subsequent image frame for each repetition until the first PSNR (PSNR1) is not larger than the second PSNR (PSNR2).

In sum, according to the video processing method and system of the present invention, the bandwidth of the network 3 is detected by the network bandwidth monitor module 12, and the pseudo resolution modification module 13 decreases the resolution of any of the source image frames 101-10n having an encoding bit rate that exceeds the detected bandwidth. The resulting relay image frame 103' is then transmitted to the receiving device 2. Therefore, the resolution of the source image frames 101-10n can be initially set high, and lowered on a frame-by-frame basis only as needed.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A video processing method to be implemented by a transmitting device and a receiving device, the transmitting device communicating with the receiving device via a network, said video processing method comprising:
   (a) configuring the transmitting device to obtain a plurality of source image frames having a standard resolution from an image sequence, and to detect a bandwidth of the network;
   (b) when an encoding bit rate of one of the source image frames obtained in operation (a) exceeds the bandwidth of the network, configuring the transmitting device to decrease a resolution of said one of the source image frames having the encoding bit rate that exceeds the bandwidth of the network to thereby obtain reduced image frame content with a reduced resolution and to generate a relay image frame containing the reduced image frame content and having an encoding bit rate that does not exceed the bandwidth of the network, and further configuring the transmitting device to generate a recovery command that includes information of the reduced image frame content, the relay image frame including a first region and a second region, a sum of sizes of the first and second regions being equal to a size of the source image frames having the standard resolution obtained in operation (a), the first region being filled with the reduced image frame content, the second region being filled with predetermined data;
   (c) configuring the transmitting device to generate a plurality of encoded image frames by encoding the source image frames obtained in operation (a) and having an encoding bit rate that does not exceed the bandwidth of the network, and by encoding the relay image frame generated in operation (b), and further configuring the transmitting device to send the encoded image frames and the recovery command to the receiving device via the network; and
   (d) configuring the receiving device to decode the encoded image frames to obtain the source image frames obtained in operation (a) and the relay image frame generated in operation (b), and when the relay image frame is obtained, further configuring the receiving device to recover from the relay image frame a restored image frame corresponding to the reduced image frame content and having the standard resolution on the basis of the recovery command;
   wherein operation (d) includes
   (d1) configuring the receiving device to store the decoded source image frames and the decoded relay image frame in a storage space of the receiving device,
   (d2) when the recovery command is received from the transmitting device, configuring the receiving device to obtain from the storage space thereof a previous decoded image frame prior to receipt of the recovery command and a subsequent decoded image frame following receipt of the recovery command, and to calculate a first peak signal-to-noise ratio (PSNR) from the previous decoded image frame and the subsequent decoded image frame,
   (d3) configuring the receiving device to remove a portion of the subsequent decoded image frame corresponding to where the second region would be located if the subsequent decoded image frame were the relay image frame, increase a resolution of a remaining portion of the subsequent decoded image frame to correspond to the standard resolution on the basis of the recovery command to thereby obtain a comparison subsequent decoded image frame, and calculate a second PSNR from the previous decoded image frame and the comparison subsequent decoded image frame, and
   (d4) configuring the receiving device to playback the subsequent decoded image frame if the first PSNR is larger than the second PSNR, and to playback the comparison subsequent decoded image frame if the first PSNR is not larger than the second PSNR.

2. The video processing method of claim 1, wherein the second region is filled with one of pixels having vector values of 0, and pixels having vector values alternating between 0 and 255.

3. The video processing method of claim 1, wherein, in operation (d4), if the first PSNR is larger than the second PSNR, operations (d2) to (d4) are repeated for a progressively successive subsequent decoded image frame in place of the former subsequent decoded image frame until the first PSNR is not larger than the second PSNR.

4. The video processing method of claim 1, wherein PSNR is defined as follows:

$$PSNR = 10 \cdot \log_{10}\left(\frac{MAX^2}{MSE}\right) \quad \text{Formula 1}$$

where MAX is a predetermined value, and MSE is a mean squared error, and is defined as:

$$MSE = \frac{1}{N}\sum_{i=0}^{N-1}\|I(i) - K(i)\|^2 \quad \text{Formula 2}$$

where (I) and (K) are image frames of the same size to be compared, I(i) and K(i) are values respectively of the image frames (I) and (K) at pixel (i), and (N) is a total number of pixels of any one of the image frames (I) and (K).

5. A video processing system comprising:
   a transmitting device connected to a network and including
     an image sequence capture module for obtaining a plurality of source image frames having a standard resolution from an image sequence,
     a network bandwidth monitor module for detecting a bandwidth of the network,
     a pseudo resolution modification module coupled to said image sequence capture module to receive the source image frames therefrom, and further coupled to said network bandwidth monitor module, said pseudo resolution modification module, when an encoding bit rate of one of the source image frame obtained by said image sequence capture module exceeds the bandwidth of the network, decreasing a resolution of said one of the source image frames having the encoding bit rate that exceeds the bandwidth of the network to thereby obtain reduced image frame content with a reduced resolution, generating a relay image frame containing the reduced image frame content and having an encoding bit rate that does not exceed the bandwidth of the network, and generating a recovery command that includes information of the reduced image frame content, the relay image frame including a first region and a second region, a sum of sizes of the first and second regions being equal to a size of the source image frames having the standard resolution obtained by said image sequence capture module, the first region being filled with the reduced image frame content, the second region being filled with predetermined data, a video encoder coupled to said pseudo resolution modification module to receive the source image frames and the relay image frame therefrom, and further coupled to said network bandwidth monitor module, said video encoder generating a plurality of encoded image frames by encoding the source image frames obtained by said image sequence capture module and having an encoding bit rate that does not exceed the bandwidth of the network, and by encoding the relay image frame generated by said pseudo resolution modification module, and a data sender coupled to said video encoder to receive the encoded image frames therefrom and further coupled to said pseudo resolution modification module to receive the recovery command therefrom, said data sender sending the encoded image frames and the recovery command to the network; and a receiving device connected to the network and including a data receiving module receiving the encoded image frames and the recovery command from said data sender of said transmitting device via the network, a video decoder coupled to said data receiving module to receive the encoded image frames therefrom, said video decoder decoding the encoded image frames to obtain the source image frames obtained by said image sequence capture module and the relay image frame generated by said pseudo resolution modification module, a resolution recovery module coupled to said video encoder to receive the source image frames and the relay image frame and further coupled to said data receiving module to receive the recovery command therefrom, said resolution recovery module recovering from the relay image frame a restored image frame corresponding to the reduced image frame content and having the standard resolution on the basis of the recovery command, a storage space coupled to said resolution recovery module, and an image playback module coupled to said resolution recovery module;

wherein said resolution recovery module stores the decoded source image frames and the decoded relay image frame in said storage space of said receiving device, when the recovery command is received from said data receiving module of said receiving device, obtains from said storage space of said receiving device a previous decoded image frame prior to receipt of the recovery command and a subsequent decoded image frame following receipt of the recovery command, and calculates a first peak signal-to-noise ratio (PSNR) from the previous decoded image frame and the subsequent decoded image frame, removes a portion of the subsequent decoded image frame corresponding to where the second region would be located if the subsequent decoded image frame were the relay image frame, increases a resolution of a remaining portion of the subsequent decoded image frame to correspond to the standard resolution on the basis of the recovery command to thereby obtain a comparison decoded subsequent image frame, and calculates a second PSNR from the previous decoded image frame and the comparison decoded subsequent image frame;

wherein said image playback module plays back the subsequent decoded image frame if the first PSNR is larger than the second PSNR, and plays back the comparison decoded subsequent image frame if the first PSNR is not larger than the second PSNR.

6. The video processing system of claim 5, wherein the second region is filled with one of pixels having vector values of 0, and pixels having vector values alternating between 0 and 255.

7. The video processing system of claim 5, wherein if the first PSNR is larger than the second PSNR with respect to the previous decoded image frame and the subsequent decoded image frame, said resolution recovery module of said receiving device calculates the first PSNR and the second PSNR with respect to one of the source image frames confirmed to have an encoding bit rate that does not exceed the bandwidth of the network and a next subsequent image frame, and said image playback module of said receiving device plays back the next subsequent image frame if the first PSNR is larger than the second PSNR, and plays back a next comparison subsequent image frame obtained from said resolution recovery module if the first PSNR is not larger than the second PSNR, said resolution recovery module and said image playback module repeating these operations with respect to a progressively successive subsequent image frame for each repetition until the first PSNR is not larger than the second PSNR.

8. The video processing system of claim 5, wherein PSNR is defined as follows:

$$PSNR = 10 \cdot \log_{10}\left(\frac{MAX^2}{MSE}\right) \qquad \text{Formula 1}$$

where MAX is a predetermined value, and MSE is a mean squared error, and is defined as:

$$MSE = \frac{1}{N}\sum_{i=0}^{N-1} \|I(i) - K(i)\|^2 \qquad \text{Formula 1}$$

where (I) and (K) are image frames of the same size to be compared, I(i) and K(i) are values respectively of the image frames (I) and (K) at pixel (i), and (N) is a total number of pixels of any one of the image frames (I) and (K).

* * * * *